United States Patent
Krusinski et al.

(10) Patent No.: US 9,206,864 B2
(45) Date of Patent: Dec. 8, 2015

(54) TORQUE CONVERTER LUG

(71) Applicant: SCHAEFFLER TECHNOLOGIES AG & CO. KG, Herzogenaurach (DE)

(72) Inventors: Eric Krusinski, Wadsworth, OH (US); Scott Schrader, Canton, OH (US)

(73) Assignee: Schaeffler Technologies AG & Co. KG, Herzogenaurzch (DE)

( * ) Notice: Subject to any disclaimer, the term of this patent is extended or adjusted under 35 U.S.C. 154(b) by 247 days.

(21) Appl. No.: 13/847,659

(22) Filed: Mar. 20, 2013

(65) Prior Publication Data

US 2013/0272779 A1    Oct. 17, 2013

Related U.S. Application Data

(60) Provisional application No. 61/624,559, filed on Apr. 16, 2012.

(51) Int. Cl.
*F16D 33/18* (2006.01)
*B21D 39/02* (2006.01)
*F16H 41/24* (2006.01)

(52) U.S. Cl.
CPC .............. *F16D 33/18* (2013.01); *B21D 39/028* (2013.01); *F16H 41/24* (2013.01); *F16D 2300/12* (2013.01); *F16D 2300/26* (2013.01); *F16H 2041/243* (2013.01); *Y10T 403/471* (2015.01); *Y10T 403/477* (2015.01); *Y10T 403/645* (2015.01)

(58) Field of Classification Search
CPC . F16D 33/18; F16D 2300/12; F16D 2300/26; F16H 41/24; F16H 45/02; B21D 39/028; B21D 53/36; B21D 53/88
USPC ............... 403/266, 270–272, 335–337, 265; 192/3.28–3.3; 228/173.6
See application file for complete search history.

(56) References Cited

U.S. PATENT DOCUMENTS

| | | | | |
|---|---|---|---|---|
| 2,258,342 A | * | 10/1941 | Tinnerman | 411/112 |
| 4,396,326 A | * | 8/1983 | McKinnie et al. | 411/103 |
| 4,729,706 A | * | 3/1988 | Peterson et al. | 411/175 |
| 6,561,330 B2 | | 5/2003 | Maienschein et al. | |
| 6,688,441 B1 | * | 2/2004 | Arhab et al. | 192/3.29 |
| 6,926,131 B1 | * | 8/2005 | Arhab et al. | 192/3.29 |
| 2005/0121278 A1 | * | 6/2005 | Arhab et al. | 192/3.29 |
| 2008/0277223 A1 | * | 11/2008 | Liang et al. | 192/3.21 |
| 2009/0314603 A1 | * | 12/2009 | Peri | 192/112 |

FOREIGN PATENT DOCUMENTS

DE    102008002139    * 12/2009

* cited by examiner

*Primary Examiner* — Josh Skroupa
(74) *Attorney, Agent, or Firm* — Kathryn A. Warner; Kevin L. Parks

(57) ABSTRACT

A lug for a torque converter includes a first radial segment, a second radial segment, and an axially extending connector segment. The first radial segment has a first aperture and respective first and second circumferential ends. The second radial segment has a second aperture aligned with the first aperture, a third circumferential end fixed to the first circumferential end, and a fourth circumferential end fixed to the second circumferential end. The axially extending connector segment joins the first and second radial segments. In an example embodiment, a pre-formed blank for the lug includes a line of symmetry passing through the connector segment.

11 Claims, 3 Drawing Sheets

TORQUE CONVERTER LUG

FIELD

The invention relates generally to a lug for a torque converter, and more specifically to a stamped sheet metal lug for a torque converter having improved durability.

BACKGROUND

Torque converter lugs are known. One example is shown in FIGS. 2-3. FIG. 2 is a front view of prior art torque converter 100. FIG. 3 is a section view of prior art torque converter 100 of FIG. 2 taken generally along line 3-3 in FIG. 2. Converter 100 includes impeller 102, stator 104, and turbine 106. Cover 108 is fixed to the impeller by welding, for example, to form a housing for the torque converter. Prior art lugs 110 are fixed to the cover by welding. Lugs 110 may be made by machining or forging, for example. Also, an example sheet metal drive plate is shown and described in commonly-assigned U.S. Pat. No. 6,561,330.

BRIEF SUMMARY

Example aspects broadly comprise a lug for a torque converter including a first radial segment, a second radial segment, and an axially extending connector segment. The first radial segment has a first aperture and respective first and second circumferential ends. The second radial segment has a second aperture aligned with the first aperture, a third circumferential end fixed to the first circumferential end, and a fourth circumferential end fixed to the second circumferential end. The axially extending connector segment joins the first and second radial segments. In an example embodiment, a pre-formed blank for the lug includes a line of symmetry passing through the connector segment.

In an example embodiment, the first and second radial segments are in contact. In an example embodiment, the first and third circumferential ends are fixed together by welding, and the second and fourth circumferential ends are fixed together by welding. In an example embodiment, the first and second apertures include a continuous thread arranged for receiving a fastener. In an example embodiment, the first circumferential end is aligned with the third circumferential end or the second circumferential end is aligned with the fourth circumferential end. In an example embodiment, a circumferential length of the first or second radial segment is greater than a circumferential length of the connector segment. In an example embodiment, the lug is manufactured from sheet metal.

Other example embodiments broadly comprise a cover assembly for a torque converter including a cover shell, at least one sheet metal lug, and first and second welds. The sheet metal lug includes a radially outer axial connector portion and first and second radial portions. The radial portions are fixed together at the radially outer axial connector portion. Each radial portion includes a first and a second circumferential end. The first weld fixes the respective first circumferential ends together and to the cover shell. The second weld fixes the respective second circumferential ends together and to the cover shell. In an example embodiment, the respective first circumferential ends or the respective second circumferential ends are aligned.

In an example embodiment, the first or second radial portion includes an aperture for receiving a fastener for connecting the cover assembly to an engine flexplate. In an example embodiment, the respective first circumferential ends or the respective second circumferential ends include a radial length, and the first or second weld extends along the entire radial length. In an example embodiment, at least a portion of the first or second weld extends circumferentially from the respective first or second circumferential end. In an example embodiment, the cover shell includes a radial surface and the at least one sheet metal lug is fixed to the radial surface.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
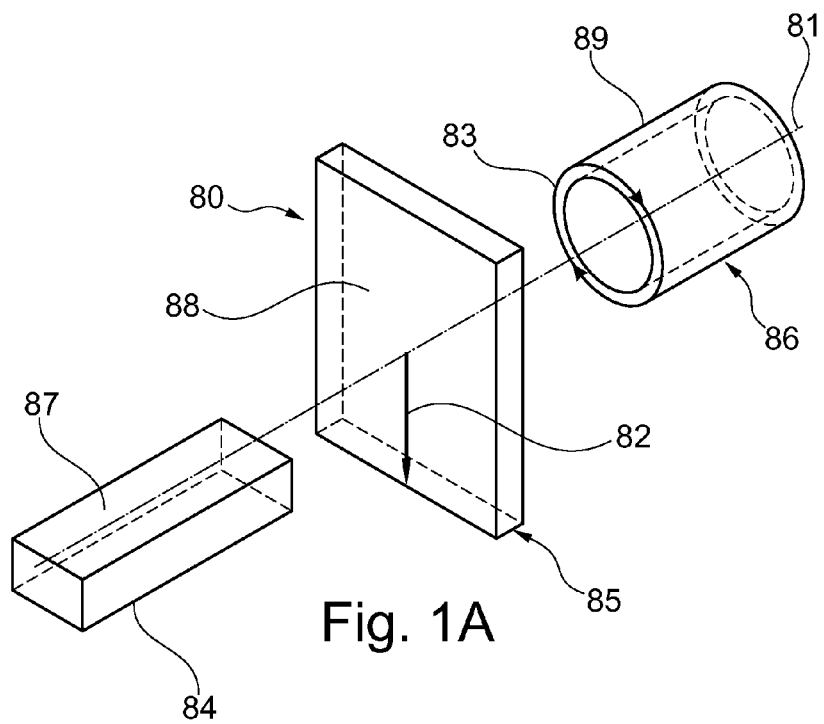
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
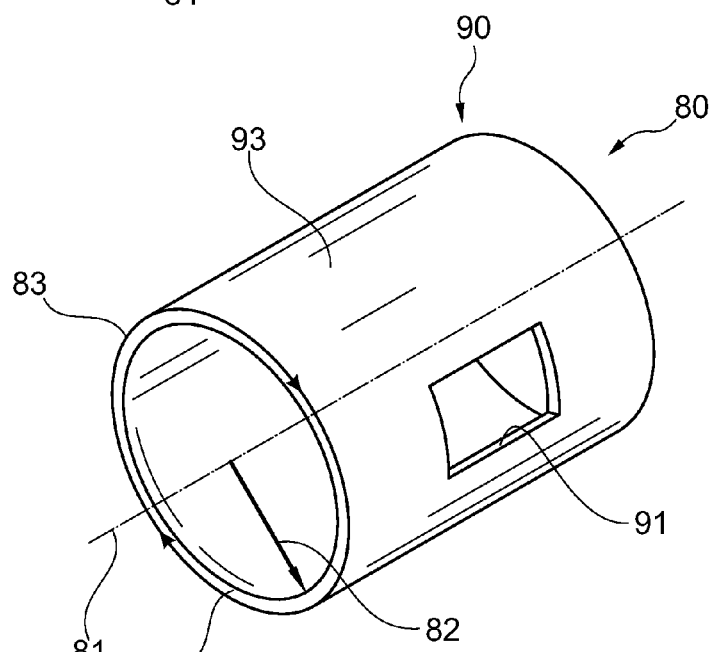
FIG. 1B is a perspective view of an object in the cylindrical coordinate system of FIG. 1A demonstrating spatial terminology used in the present application.
Figure 3:
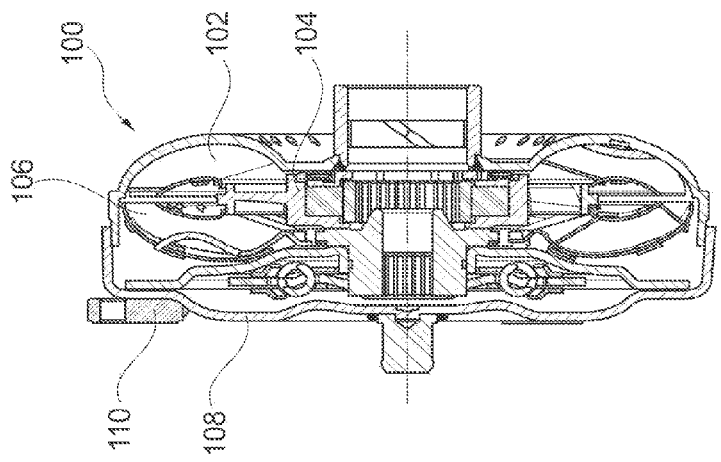
FIG. 3 is a section view of the prior art torque converter of FIG. 2 taken generally along line 3-3 in FIG. 2.
Figure 2:
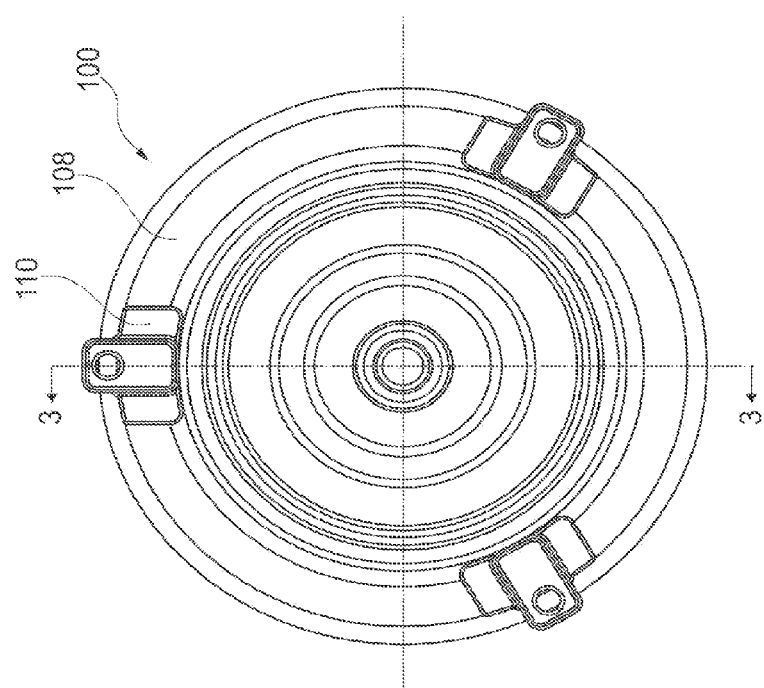
FIG. 2 is a front view of a prior art torque converter.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 4:
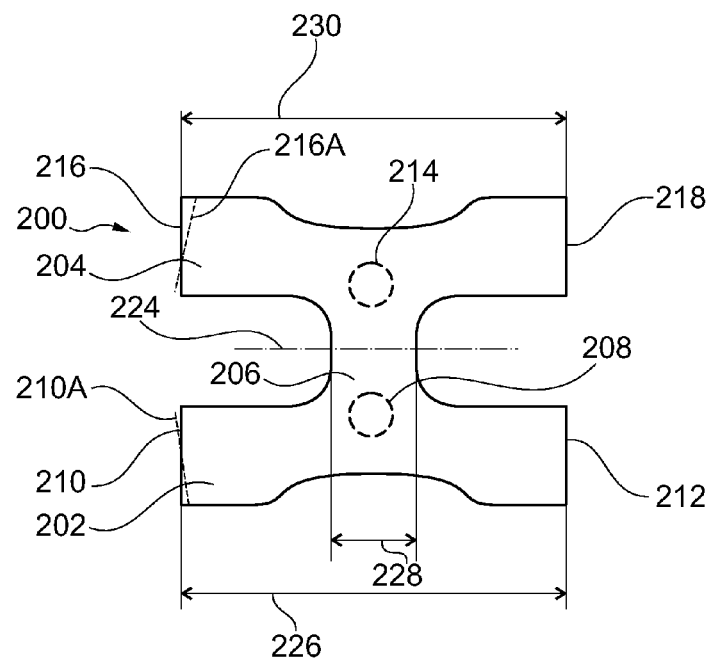
FIG. 4 is a pre-form blank of a lug according to an example aspect.
Figure 5:
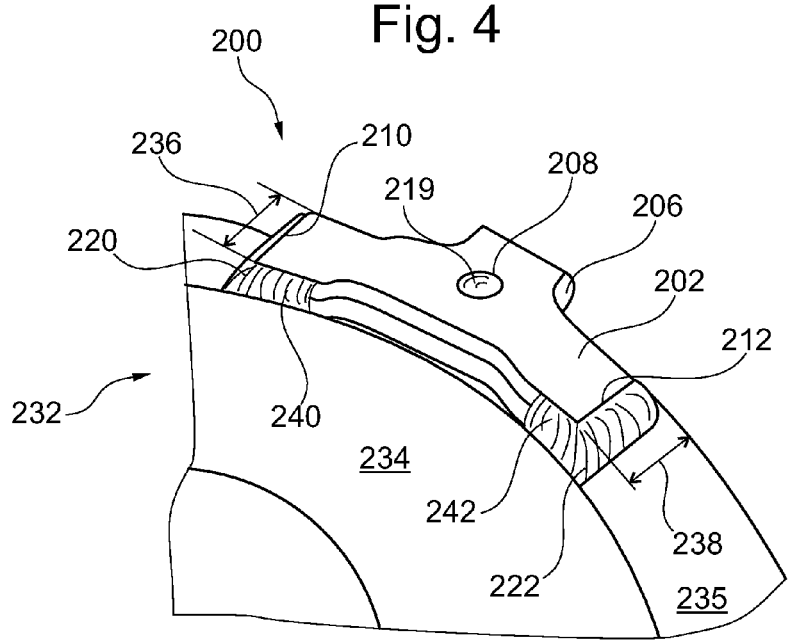
FIG. 5 is a partial cover assembly showing the lug of FIG. 4 in a formed state.

The following description is made with reference to FIGS. 4-5. FIG. 4 is a pre-form blank of lug 200 according to an example aspect. FIG. 5 is a partial cover assembly showing sheet metal lug 200 of FIG. 4 in a formed state. Lug 200 includes radial segments 202 and 204, and connector segment 206. Segment 202 includes aperture 208 and circumferential ends, or surfaces, 210 and 212. Segment 204 includes aperture 214 and circumferential ends, or surfaces, 216 and 218. Apertures 208 and 214 are shown as dashed lines in FIG. 4 because some embodiments may include apertures in the blank while others may include apertures that are pierced after the lug is formed. In the formed state shown in FIG. 5, apertures 208 and 214 are aligned. In an example embodiment, the apertures form a hole extending continuously through segments 202 and 204. In an example embodiment, the apertures include a continuous thread 219 arranged for receiving a fastener.

In the cover assembly shown in FIG. 5, end 216 is fixed to end 210, and end 218 is fixed to end 212. In an example embodiment, ends 210 and 216 are aligned, and ends 212 and 218 are aligned. In an example embodiment, radial segments 202 and 204 are in contact and the respective pairs of circumferential ends are fixed by respective welds 220 and 222. Other embodiments (not shown) may include radial segments 202 and 204 connected together by spot welds, for example. In the formed condition shown in FIG. 5, connector segment 206 extends axially to connect or join segments 202 and 204.

As shown in FIG. 4, an example pre-formed blank for lug 200 includes line of symmetry 224 passing through connector segment 206. Circumferential length 226 of radial segment 202 is greater than circumferential length 228 of connector segment 206. Similarly, circumferential length 230 of radial segment 204 is greater than circumferential length 228 of connector segment 206. In an example embodiment, lug 200 is manufactured from sheet metal. Although lug 200 is shown as symmetric about line of symmetry 224, other embodiments may exist. For example, in a formed state, ends 210 and 216, and ends 212 and 218, may be aligned with respective radial lines passing through a rotational axis of cover assembly 232 as indicated by dashed lines 210A and 216A in FIG. 4.

Cover assembly 232 includes cover shell 234 and sheet metal lug 200. Lug 200 may be one of a plurality of lugs fixed to shell 234. Lug 200 includes radial portions 202 and 204 fixed together at radially outer axial connector portion 206. Ends 210 and 216 are circumferentially aligned and fixed together and to radial surface 235 of cover shell 234 by weld 220. Ends 212 and 218 are circumferentially aligned and fixed together and to cover shell 234 by weld 222. In an example embodiment, portions 202 and 204 include respective apertures 208 and 214 for receiving a fastener for connecting cover assembly 232 to an engine flexplate (not shown). In an example embodiment, the apertures are threaded and the fastener is a bolt. Ends 210 and 212 include respective radial lengths 236 and 238, and welds 220 and 222 extend respectively along the entire radial lengths. Respective portions 240 and 242 of welds 220 and 222 extend circumferentially from respective ends 210 and 212.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A lug for a torque converter comprising:
a first radial segment with a first aperture and respective first and second circumferential ends;
a second radial segment with a second aperture aligned with the first aperture, a third circumferential end fixed to the first circumferential end via a first weld, and a fourth circumferential end fixed to the second circumferential end via a second weld;
an axially extending connector segment joining, the first and second radial segments; and;
wherein the first and third circumferential ends or the second and fourth circumferential ends include respective radial lengths, and the first or second weld extends along the entire radial length.

2. The lug of claim 1 wherein a pre-formed blank for the lug includes a line of symmetry passing through the connector segment.

3. The lug of claim 1 wherein the first and second apertures include a continuous thread arranged for receiving a fastener.

4. The lug of claim 1 wherein the first circumferential end is aligned with the third circumferential end or the second circumferential end is aligned with the fourth circumferential end.

5. The lug of claim 1 wherein a circumferential length of the first or second radial segment is greater than a circumferential length of the connector segment.

6. The lug of claim 1 wherein the lug is manufactured from sheet metal.

7. A cover assembly for a torque converter comprising:
a cover shell;
at least one sheet metal lug including:
a radially outer axial connector portion; and,
first and second radial portions fixed together at the radially outer axial connector portion, the first radial portion having a first aperture and respective first and second circumferential ends, the second radial portion having a second aperture and respective third and fourth circumferential ends, and the second aperture is aligned with the first aperture;
a first weld fixing the first and third circumferential ends together and to the cover shell; and,
a second weld fixing the second and fourth circumferential ends together and to the cover shell; and,
wherein the first and third circumferential ends or the second and fourth circumferential ends include respective radial lengths, and the first or second weld extends along the entire radial length.

8. The cover assembly of claim 7 wherein the first and third circumferential ends or the second and fourth circumferential ends are aligned.

9. The cover assembly of claim 7 wherein the first or second apertures are for receiving a fastener for connecting the cover assembly to an engine flexplate.

10. The cover assembly of claim 7 wherein at least a portion of the first or second weld extends circumferentially from the respective first or second circumferential end.

11. The cover assembly of claim 7 wherein the cover shell includes a radial surface and the at least one sheet metal lug is fixed to the radial surface.

\* \* \* \* \*